United States Patent
Barriere et al.

(10) Patent No.: US 12,198,096 B2
(45) Date of Patent: Jan. 14, 2025

(54) SERVICE PARTS DYNAMIC POOLING

(71) Applicant: Dell Products L.P., Round Rock, TX (US)

(72) Inventors: Mario Cornejo Barriere, Round Rock, TX (US); Babak Farmanesh, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 463 days.

(21) Appl. No.: 17/502,119

(22) Filed: Oct. 15, 2021

(65) Prior Publication Data

US 2023/0124795 A1  Apr. 20, 2023

(51) Int. Cl.
*G06Q 10/087* (2023.01)
*G06F 119/02* (2020.01)

(52) U.S. Cl.
CPC ........ *G06Q 10/087* (2013.01); *G06F 2119/02* (2020.01)

(58) Field of Classification Search
CPC ............ G06Q 10/087; G06Q 10/06315; G06F 2119/02; G06F 30/20
See application file for complete search history.

(56) References Cited

U.S. PATENT DOCUMENTS

| | | | | |
|---|---|---|---|---|
| 6,339,764 | B1* | 1/2002 | Livesay ................ | G06Q 10/087 705/28 |
| 8,265,986 | B2* | 9/2012 | Cheng ................ | G06Q 30/0202 705/13 |
| 8,433,596 | B2* | 4/2013 | Schierholt .......... | G06Q 10/0631 705/28 |
| 8,515,835 | B2* | 8/2013 | Wu ...................... | G06Q 10/087 705/28 |
| 8,700,443 | B1* | 4/2014 | Murray ................ | G06Q 10/087 705/7.31 |
| 10,062,053 | B1* | 8/2018 | Oakley .............. | G06Q 10/0875 |
| 11,315,059 | B1* | 4/2022 | R ........................... | G06Q 10/08 |
| 11,615,373 | B2* | 3/2023 | Malecha ............ | G06Q 30/0201 705/28 |
| 11,645,611 | B1* | 5/2023 | Puthiyapurayil ........ | G06N 5/01 705/28 |
| 2002/0072999 | A1* | 6/2002 | Andres ................ | G06Q 10/087 705/28 |
| 2003/0101107 | A1* | 5/2003 | Agarwal .............. | G06Q 10/087 705/28 |

(Continued)

*Primary Examiner* — Michael Jared Walker
(74) *Attorney, Agent, or Firm* — Daly, Crowley, Mofford & Durkee, LLP

(57) ABSTRACT

A method for use in a computing device, comprising: obtaining a pooling plan, the pooling plan identifying a respective pooling warehouse for at least a first article; receiving a first data set that identifies one or more second articles that can be substituted with the first article; receiving a second data set that identifies: (i) local demand for the first article at the pooling warehouse, (ii) local demand for the first article at one or more unplanned warehouses for the first article, and (iii) local demand for the second articles at one or more unplanned warehouses for the second articles; calculating an efficiency score for the pooling plan by evaluating a model for gauging an efficiency of the pooling plan, the model being evaluated based on the pooling plan, the first data set, and the second data set.

15 Claims, 7 Drawing Sheets

(56) References Cited

U.S. PATENT DOCUMENTS

| | | | |
|---|---|---|---|
| 2005/0177353 A1* | 8/2005 | Slater | G06F 30/20 |
| | | | 703/6 |
| 2006/0020485 A1* | 1/2006 | Schierholt | G06Q 10/087 |
| | | | 705/305 |
| 2006/0031084 A1* | 2/2006 | Schierholt | G06Q 10/0631 |
| | | | 705/305 |
| 2006/0047479 A1* | 3/2006 | Desai | G06Q 10/0875 |
| | | | 702/183 |
| 2006/0069581 A1* | 3/2006 | Chien | G06Q 40/08 |
| | | | 705/400 |
| 2008/0133299 A1* | 6/2008 | Sitarski | G06Q 10/0635 |
| | | | 705/7.27 |
| 2016/0210683 A1* | 7/2016 | Aqlan | G06Q 30/0635 |
| 2017/0255903 A1* | 9/2017 | Chowdhry | G06Q 10/0833 |
| 2018/0075401 A1* | 3/2018 | Harsha | G06Q 30/0202 |
| 2018/0137455 A1* | 5/2018 | Mack | G06Q 10/087 |
| 2021/0047121 A1* | 2/2021 | Stevens | B65G 1/1371 |
| 2022/0245574 A1* | 8/2022 | Cella | G06Q 10/087 |
| 2022/0343244 A1* | 10/2022 | Yesudas | G06N 5/04 |
| 2022/0351220 A1* | 11/2022 | Johnson | G06N 20/00 |
| 2023/0004906 A1* | 1/2023 | Durai Raj K | G06N 3/126 |
| 2023/0044067 A1* | 2/2023 | Fang | G06Q 10/087 |

* cited by examiner

| | WAREHOUSE #1 | WAREHOUSE #2 | WAREHOUSE #3 | WAREHOUSE #4 | WAREHOUSE #5 |
|---|---|---|---|---|---|
| PART 1 | Pooling Location | Unplanned Location | Unplanned Location | Pooling Location | Unplanned Location |
| PART 2 | Pooling Location | Unplanned Location | Unplanned Location | Unplanned Location | Pooling Location |
| PART 3 | Pooling Location | Unplanned Location | Unplanned Location | Pooling Location | Unplanned Location |
| PART 4 | Unplanned Location | Unplanned Location | Unplanned Location | Pooling Location | Unplanned Location |
| PART 5 | Unplanned Location | Pooling Location | Unplanned Location | Pooling Location | Unplanned Location |

| | STOCK LEVEL WAREHOUSE #1 | STOCK LEVEL WAREHOUSE #2 | STOCK LEVEL WAREHOUSE #3 | STOCK LEVEL WAREHOUSE #4 | STOCK LEVEL WAREHOUSE #5 |
|---|---|---|---|---|---|
| PART 1 | 5 | 0 | 0 | 2 | 0 |
| PART 2 | 1 | 0 | 0 | 1 | 1 |
| PART 3 | 5 | 0 | 0 | 2 | 1 |
| PART 4 | 1 | 1 | 1 | 2 | 0 |
| PART 5 | 5 | 0 | 0 | 7 | 0 |

| | 326 |
|---|---|
| WAREHOUSE #1 | WAREHOUSE #2, WAREHOUSE #3 |
| WAREHOUSE #2 | WAREHOUSE #1, WAREHOUSE #3 |
| WAREHOUSE #3 | WAREHOUSE #1, WAREHOUSE #2 |
| WAREHOUSE #4 | WAREHOUSE #5 |
| WAREHOUSE #5 | WAREHOUSE #4 |

FIG. 4C

| | 328 |
|---|---|
| PART 1 | PART 2 |
| PART 2 | PART 1 |
| PART 3 | PART 4 |
| PART 4 | N/A |
| PART 5 | NA |

FIG. 4D

SERVICE PARTS DYNAMIC POOLING

BACKGROUND

Service parts departments of corporations routinely plan for parts that may need to be replaced if a system fails. Forecasting and planning for rare parts failures is similar to planning that is performed for insurance purposes. It involves determining the respective probabilities of failure for different parts, and based on these probabilities and other factors, determining whether to stock the parts and in what location.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided for use in a computing device, comprising: obtaining a pooling plan, the pooling plan identifying a respective pooling warehouse for at least a first article; receiving a first data set that identifies one or more second articles that can be substituted with the first article; receiving a second data set that identifies: (i) local demand for the first article at the pooling warehouse, (ii) local demand for the first article at one or more unplanned warehouses for the first article, and (iii) local demand for the second articles at one or more unplanned warehouses for the second articles; and calculating an efficiency score for the pooling plan by evaluating a model for gauging an efficiency of the pooling plan, the model being evaluated based on the pooling plan, the first data set, and the second data set.

According to aspects of the disclosure, a system is provided, comprising: a memory; and one or more processors operatively coupled to the memory, the one or more processors further being configured to perform the operations of: obtaining a pooling plan, the pooling plan identifying a respective pooling warehouse for at least a first article; receiving a first data set that identifies one or more second articles that can be substituted with the first article; receiving a second data set that identifies: (i) local demand for the first article at the pooling warehouse, (ii) local demand for the first article at one or more unplanned warehouses for the first article, and (iii) local demand for the second articles at one or more unplanned warehouses for the second articles; and calculating an efficiency score for the pooling plan by evaluating a model for gauging an efficiency of the pooling plan, the model being evaluated based on the pooling plan, the first data set, and the second data set.

According to aspects of the disclosure, a non-transitory computer-readable medium storing one or more processor-executable instructions, which, when executed by at least one processor, cause the at least one processor to perform the operations of: obtaining a pooling plan, the pooling plan identifying a respective pooling warehouse for at least a first article; receiving a first data set that identifies one or more second articles that can be substituted with the first article; receiving a second data set that identifies: (i) local demand for the first article at the pooling warehouse, (ii) local demand for the first article at one or more unplanned warehouses for the first article, and (iii) local demand for the second articles at one or more unplanned warehouses for the second articles; and calculating an efficiency score for the pooling plan by evaluating a model for gauging an efficiency of the pooling plan, the model being evaluated based on the pooling plan, the first data set, and the second data set.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 4A is a diagram of an example of a pooling plan, according to aspects of the disclosure;

FIG. 4B is a diagram of an example of a pooling plan, according to aspects of the disclosure;

FIG. 4C is a diagram of an example of a connectivity map, according to aspects of the disclosure;

FIG. 4D is a diagram of an example of a substitution map, according to aspects of the disclosure.

DETAILED DESCRIPTION

Figure 1:
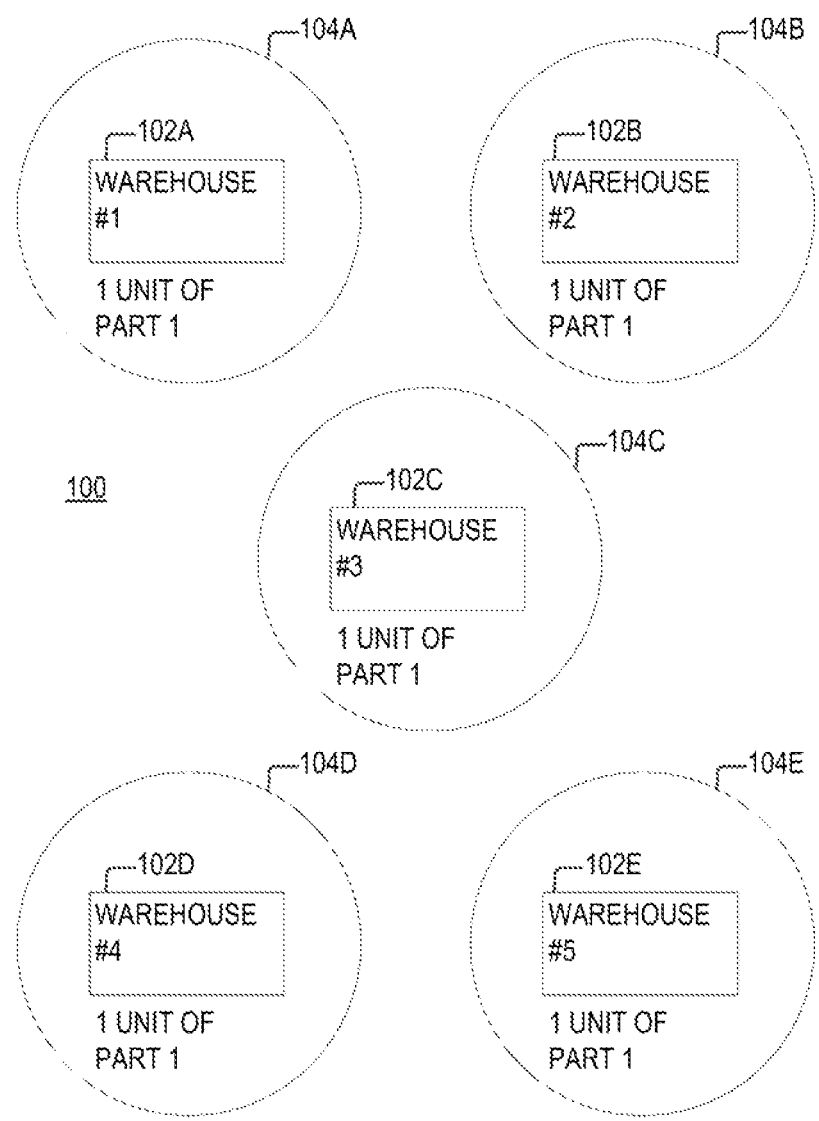
FIG. 1 is a diagram of an example of a distribution network, according to aspects of the disclosure.

The present disclosure is directed to a system for evaluating plans for stocking parts at different warehouses in a distribution network. If a customer of a company has bought a same-business-day warranty, the company may be committed to getting the part to the customer within few hours. So, it is important for the company to make sure that the right parts are available in the right location at the right time. Since a company can have a large network of parts inventories, predicting where the next demand will happen can be very challenging.

As an example, in the United States alone, a company may have in excess of 120 warehouses with tens of millions of dollars' worth of inventory. If the company were to stock at least one unit of each part across all these warehouses, the cost would be prohibitive. In order to be certain that the company will have the necessary parts where and when they are needed, the company may use a pooling model based on optimization. This model may provide an efficient solution to the challenge presented by expensive parts with very low failure probability. Instead of stocking each part at each warehouse across the network, the model allows the parts to be placed at pooled locations, from where they can be distributed to unplanned locations.

In some respects, the use of pooling locations allows leveraging a larger geographical area with a high density of flights or an enhanced ground transportation network. A shipment by considering the best and most feasible transportation mode between customer location and the pooled warehouse. Essentially, by identifying the right pooling locations, a company can balance the expedited transportation cost versus the part investment.

However, identifying the proper pooling locations is a challenge unto itself because a warehouse can be linked with so many other warehouses. For instance, in the US network with approximately 120 locations and approximately 1000 connections, there could be $10^{100}$ possible pooling plans which mathematically could be a challenge to solve. To put this in perspective, it is estimated that the Earth has $10^{18}$ grains of sand.

In the disclosure that follows, a system is provided for evaluating the efficiency and/or feasibility of different pooling plans. The system takes as input a definition of a pooling plan and outputs a score for the pooling plan which indicates how efficient the pooling plan has been found to be by the system. If the score indicates that the efficiency of the pooling layout is not satisfactory, another pooling plan can be evaluated until one is found that has satisfactory efficiency.

The term "pooling" as used throughout may refer to storing parts in fewer, but strategic locations, which are herein referred to as "pooling locations" and focusing on (expedited) shipments to ship the parts from pooling locations to unplanned ones. The term "pooling plan" may refer to a numerical array, an object array, a string, an alphanumerical string, and/or any other suitable data item that implicitly or explicitly identifies one or more pooling locations for an article. Throughout the disclosure, the terms "location" and "warehouse" are used interchangeably, when permitted by context. The term "warehouse", as used herein, shall refer to any storage facility, including, but not limited to, a stand-alone storage facility, the storage facility at the back of a store or service facility, the fixtures in the aisles of a store, and/or any other space that is used for storing an inventory of articles. As used throughout the disclosure, the term "article" shall refer to any object that is being stocked in a warehouse. Although the example of FIGS. 1-5 is provided in the context of stocking computer parts, it will be understood that the ideas and concepts that are presented throughout the disclosure are not limited to evaluating the pooling plan for any specific item or set of items.

Figure 2:
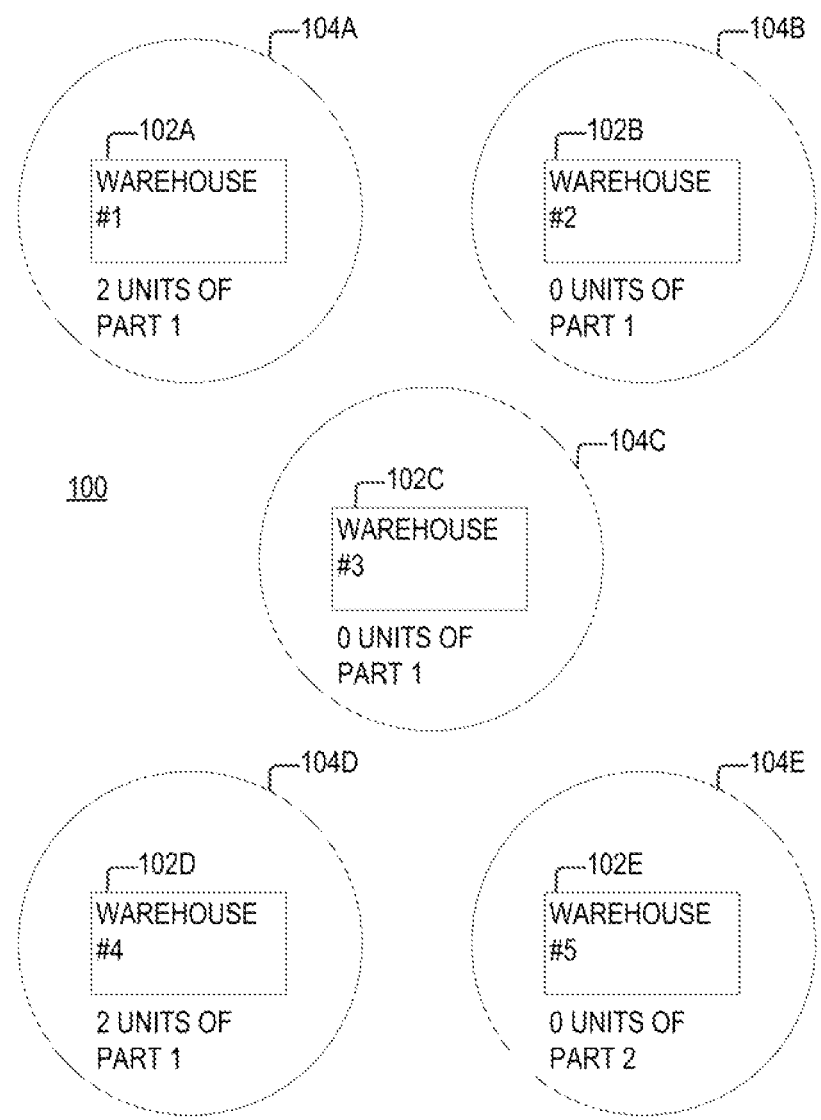
FIG. 2 is a diagram of an example of a distribution network, according to aspects of the disclosure.

FIGS. 1-2 show an example of a distribution network 100, according to aspects of the disclosure. The distribution network 100 includes warehouses 102A-E. Each of warehouses 102A-E is associated with a respective one of service areas 104A-E. Specifically, warehouse 102A is associated with service area 104A; warehouse 102B is associated with service area 104B; warehouse 102C is associated with service area 104C; warehouse 102D is associated with service area 104D; and warehouse 102E is associated with service area 104E.

FIG. 1 shows the distribution network 100 in a state in which the distribution network does not use pooling for a particular part, which is herein referred to as "part 1." In the example of FIG. 1, each of warehouses 102A-E stores one unit of part 1. Notably, in instances in which the cost of part 1 is substantial (e.g., $X), the cost of maintaining inventory at each of the five warehouses would also be high (e.g., $5X).

FIG. 2 shows the distribution network 100 in a state in which the distribution network uses pooling for part 1. According to the pooling plan, warehouse 102D stores two units of part 1, warehouse 102D also stores 2 units of part 1, and warehouses 102B-C and 102E maintain no stock of part 1. In other words, under the nomenclature of the present disclosure, warehouses 102A and 102D are pooling locations for part 1, and locations are 102B-C and 102E are unplanned locations for part 1. As can be readily appreciated, the pooling plan (shown in FIG. 2) requires the maintenance of a smaller inventory of part 1, which in turn results in a reduced cost of the inventory (e.g., $4X).

In some instances, orders for part 1 that come from service area 104E may go through warehouse 102E. Warehouse 102E may order part 1 from one of the pooling locations (e.g., warehouse 102A or warehouse 102B). Part 1 may then be shipped to warehouse 102E from the pooling location from which it is ordered, and subsequently delivered (by personnel at warehouse 102E) to an address in service area 104E where the initial order for part 1 came from. In other words, orders for part 1 that are received at any of the unplanned locations (i.e., warehouses 102B, 102C, and 102E) may be fulfilled by one of the pooling locations (i.e., warehouses 102A and 102D), which involves shipping part 1 from one of the pooling locations to any of the unplanned locations.

As used herein, the term "unplanned location for a particular part" may refer to a location that relies on one or more pooling locations to make up for shortages of the particular part at that location. An unplanned location may maintain no stock of the part at all, or it can maintain limited stock only, which is not guaranteed to meet local demand at the unplanned location. The phrase "local demand for a particular part at a given location" may refer to any measure of the volume of orders for the particular part that are received at the given location.

A "planned location for a particular part" may be a "pooling location for the part" or another location that is ideally guaranteed, by a distribution network, to maintain a particular stock level for the part. In other words, the distribution network may be configured to give a high priority to replenishing the part at the planned location, as the stock of the part at the planned location is being diminished. By contrast, in an "unplanned location for the part", the distribution network may maintain no stock of the part at all, or it may place a low priority on keeping the part stocked. In other words, in some respects, an "unplanned location for a particular part" may be defined as such by the level of priority that a distribution network places on maintaining a stock of the part at the unplanned location. A distribution network may place a lower priority on stocking the part at "an unplanned location for the part" that it would on stocking the part at a "pooling location for the part." Moreover, in some implementations, the distribution network may not stock the part at all at the "unplanned location for the part."

Figure 3:
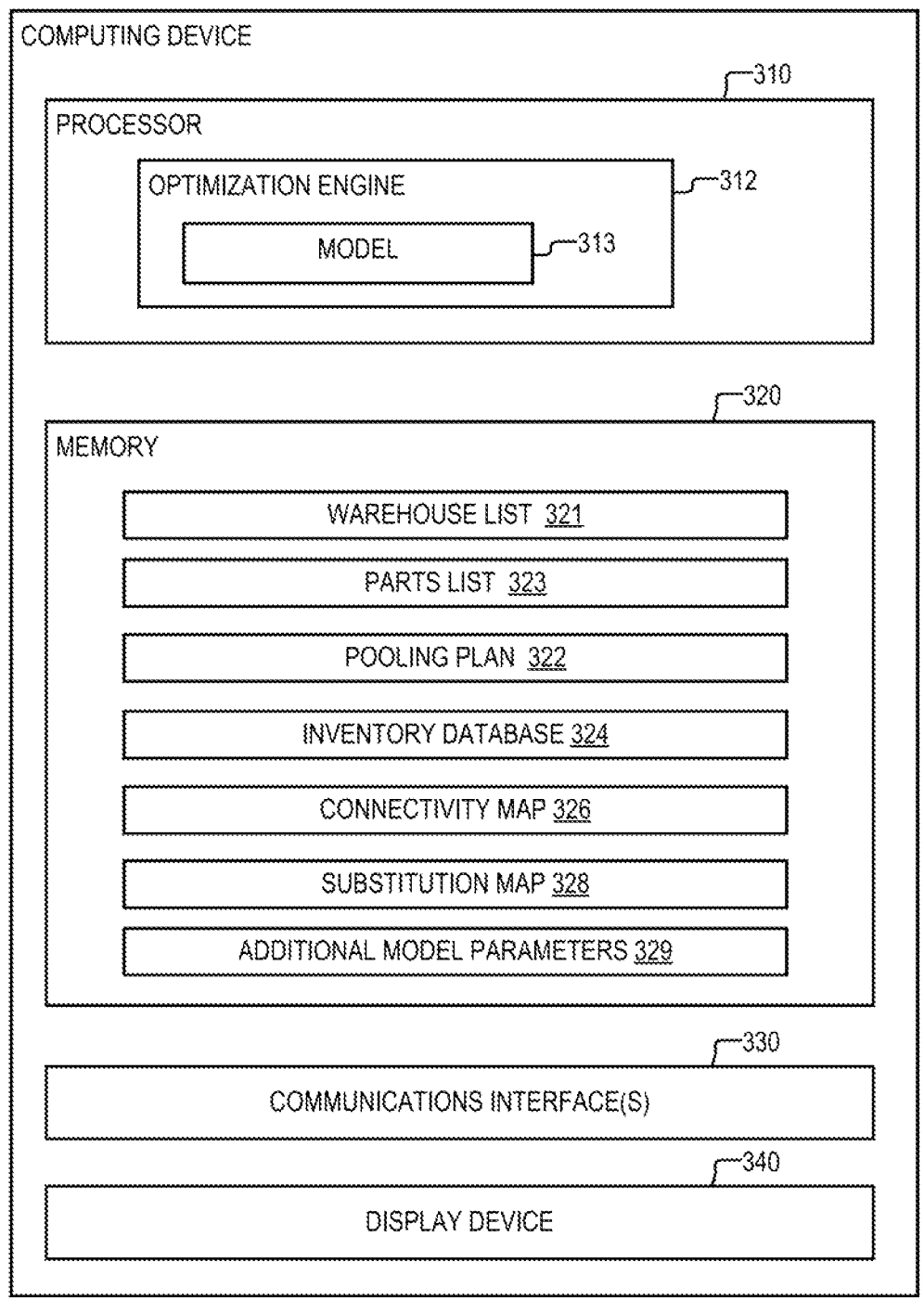
FIG. 3 is a diagram of an example of a computing device, according to aspects of the disclosure.

FIG. 3 is a diagram of an example of a computing device 300, according to aspects of the disclosure. The computing device 300 may include a desktop computer, a laptop computer, a smartphone, and/or any other suitable type of computing device. As illustrated, the computing device may include a processor 310, a memory 320, a communications interface 330, and a display device 340. The processor 310 may include any suitable type of processing circuitry, such as one or more of an application-specific integrated circuit (ASIC), a field-programmable gate array (FPGA), and/or a general-purpose processor (e.g., an ARM-based processor, an x86 processor, etc.). The memory 320 may include any suitable type of volatile and/or non-volatile memory. For example, in some implementations, the memory 320 may include one or more of random-access memory (RAM), a read-only memory (ROM), a solid-state drive (SSD), electrically erasable programmable read-only memory (EE-PROM), network-accessible storage (NAS), a redundant array of independent disks (RAID) and/or any other suitable type of memory. The communications interface 330 may include a Bluetooth interface, a Wi-Fi interface, a ZigBee interface, a Universal Serial Bus (USB) interface, and/or any other suitable type of interface. Although in the example of FIG. 3 the device 300 is depicted as an integrated system, it will be understood that alternative implementations are possible in which the device 300 is a distributed system, comprising a plurality of computing devices that are connected to one another via a communications network.

The processor 310 may be configured to execute an optimization engine 312. The engine 312 may be configured to execute a model 313 for assessing the efficiency of pooling plans. The model 313 may include a non-linear stochastic optimization model. The model 313, in some implementations, may include one of objective functions OF1 or OF2 (discussed further below), and their corresponding constraints.

In operation, the engine 312 may receive a pooling plan as input (e.g., the pooling plan 322). Next, the engine 312 may execute (or evaluate) the model 313 based on the pooling plan. As a result of executing (or evaluating) the model 313, the engine 312 may generate an efficiency score for the pooling plan. The efficiency score may include an integer, a binary number, and/or any other suitable type of number, string or alphanumerical string. The efficiency score may indicate whether it would be efficient to implement in practice the pooling plan that is submitted as input. In some implementations, the engine 312 may execute a process 500, which is discussed further below with respect to FIG. 5.

The memory 320 may be configured to store a warehouse list 321, a parts list 323, a pooling plan 322, an inventory database 324, a connectivity map 326, a substitution map 328, and model parameters 329.

The warehouse list 321 may include a list of one or more warehouses (or other locations) in a distribution network. The warehouse list 321 may include the set $\mathcal{L}$ (or any data for deriving the set $\mathcal{L}$ ), which is discussed further below with respect to objective functions OF1 and OF2.

The parts list 323 may include a list of a plurality of parts (or other articles) that are stocked in one or more of the warehouses. The parts list 323 may include the set $\mathcal{P}$ (or any data for deriving the set $\mathcal{P}$ ), which is discussed further below with respect to objective functions OF1 and OF2.

The pooling plan 322 may include one or more data structures that identify which ones of the warehouses are designated as pooling locations (or pooling warehouses) for different parts. In some implementations, the pooling plan 322 may be implemented as a set of binary values Y, which are discussed further below with respect to objective functions OF1 and OF2. In some implementations, the pooling plan 322 may be implemented as a set of stock level values S, which are discussed further below with respect to constraint C1 of objective function OF1. Further examples of the pooling plan 322 are provided below with respect to FIGS. 4A-B.

The inventory database 324 may include one or more data structures that indicate how much inventory of each of a plurality of parts should be maintained at different locations in a distribution network (e.g., the distribution network 100). The inventory database 324 may be a database used by the distribution network to determine the stock level for different parts at different warehouses (e.g., the distribution warehouses). The stock levels for the parts, which are listed in the inventory database may be used by the distribution network to determine where the part needs to be stocked, and what quantities of the part need to be stocked at different locations. Although in the example of FIG. 3 the inventory database 324 is executed on the same device as the engine 312, in practice the inventory database 324 and the engine 312 are more likely to be executed on different computing devices/systems.

The connectivity map 326 may include one or more data structures that identify one or more transportation links that exist between different locations in a distribution network. In some implementations, for each of the transportation links, the connectivity map may identify cost (e.g., cost per unit distance per unit weight, etc.) for shipping parts over that link. In some implementations, the connectivity map 326 may include a set of values r that specify the respective distances between different locations. In some implementations, the connectivity map 326 may include a set of values c that specify the shipping cost per unit distance for different ones of the transportation links. In some implementations, the connectivity map 326 may include the set $\mathcal{LA}$ (or any data for deriving the set $\mathcal{LA}$ ), which is discussed further below with respect to objective functions OF1 and OF2. A further example of the connectivity map 326 is discussed below with respect to FIG. 4C.

The substitution map 328 may include one or more data structures that identify parts that are interchangeable. The substitution map 328 may include the set $\mathcal{C}$ (or any data for deriving the set $\mathcal{C}$ ), which is discussed further below with respect to objective functions OF1 and OF2. Additionally or alternatively, the substitution map 328 may include the values X (or any data for deriving the values X), which are discussed further below with respect to objective functions OF1 and OF2. A further example of the substitution map 328 is discussed below with respect to FIG. 4D.

The model parameters 329 may include any remaining parameters, sets, or tuning parameters, that are used in evaluating the model 313, and which are discussed further below with respect to objective functions OF1 and OF2. By way of example, the model parameters 329 may include one or more of: (1) the values pr, which specify the price of different parts (in the parts list 323), (ii) the values o that specify the on-hand stock for different parts (in the parts list 323), (iii) the values bo that specify if any of the parts are available on-hand at different locations, and/or (iv) the values f which specify forecasted demand for different parts (in the parts list 323), all of which are discussed further below with respect to objective functions OF1 and OF2

FIG. 4A is an example of the pooling plan 322, in accordance with one implementation. As illustrated, the pooling plan 322 may identify a plurality of parts and a plurality of warehouses. For each part-warehouse pair, the pooling plan 322 may indicate whether the given warehouse is designated to serve as a pooling location for the given part. In the example of FIG. 4A, the pooling plan 322 indicates that warehouses 1 and 4 are pooling locations for part 1, whereas warehouses 2, 3, and 5 are unplanned locations for that part. The pooling plan 322 further indicates that warehouses 1 and 5 are pooling locations for part 2, whereas warehouses 2-4 are unplanned locations for part 2. The pooling plan 322 further indicates that warehouses 1 and 4 are pooling locations for part 3, whereas warehouses 2, 3, and 5 are unplanned locations for part 3. The pooling plan 322 further indicates that warehouse 4 is a pooling location for part 4, whereas warehouses 1-3 and 5 are unplanned locations for part 4. The pooling plan 322 further indicates that that warehouses 2 and 4 are pooling locations for part 5, whereas warehouses 1, 3, and 5 are unplanned locations for part 5.

FIG. 4B is an example of the pooling plan 322, in accordance with another implementation. In the example of FIG. 4B, the pooling plan 322 lists the stock levels that need to be maintained at different warehouses. If a stock level greater than 0 is listed for a particular part-warehouse pair, this is an indication that the warehouse is intended to serve as a pooling location for the part. If a stock level of 0 is listed for a particular part-warehouse pair, this is an indication that the warehouse is not designated as a pooling location. In the example of FIG. 4B, the pooling plan 322 provides that: warehouse 1 should store 5 units of part 1, warehouse 2 should store 0 units of part 1, warehouse 3 should store 0 units of part 1, warehouse 4 should store 2 units of part 1, and warehouse 5 should store 0 units of part 1. The pooling plan 322 further provides that: warehouse 1 should store 1 unit of part 2, warehouse 2 should store 0 units of part 2, warehouse 3 should store 0 units of part 2, warehouse 4 should store 1 units of part 1, and warehouse 5 should store 1 unit of part 1. The pooling plan 322 further provides that: warehouse 1 should store 5 units of part 3, warehouse 2 should store 0 units of part 3, warehouse 3 should store 0 units of part 3, warehouse 4 should store 2 units of part 3, and warehouse 5 should store 1 unit of part 3. The pooling plan 322 further provides that: warehouse 1 should store 1 unit of part 4, warehouse 2 should store 1 unit of part 4, warehouse 3 should store 1 unit of part 4, warehouse 4 should store 2 units of part 4, and warehouse 5 should store 0 units of part 4. The pooling plan 322 further provides that: warehouse 1 should store 5 units of part 5, warehouse 2 should store 0 units of part 5, warehouse 3 should store 0 units of part 5, warehouse 4 should store 7 units of part 5, and warehouse 5 should store 0 units of part 5.

FIG. 4C is a diagram of the connectivity map 326, according to one implementation. As noted above, the connectivity map 326 may include one or more data structures that identify available transportation links between two or more locations in a distribution network. According to the example of FIG. 4C, the connectivity map 326 provides that warehouse 1 is connected by direct transportation links to warehouse 2 and warehouse 3. The connectivity map 326 further provides that warehouse 2 is connected by direct transportation links to warehouse 1 and warehouse 3. The connectivity map 326 further provides that warehouse 3 is connected by direct transportation links to warehouse 1 and warehouse 2. The connectivity map 326 further provides that warehouse 4 is connected by a direct transportation link to warehouse 5. The connectivity map 326 further provides that warehouse 5 is connected by a direct transportation link to warehouse 4.

FIG. 4D is a diagram of the substitution map 328, according to aspects of the disclosure. In the example of FIG. 4D, the substitution map 328 provides that part 2 can be used as a substitute for part 1. The substitution map 328 further provides that part 1 can be used as a substitute for part 2. The substitution map 328 further provides that part 4 can be used as a substitute for part 3. The substitution map 328 further provides that no substitutes are available for parts 4 and 5.

The model 313 is now described in further detail. More specifically, the model 313 is based on the following sets:

$\mathcal{P} : \{1 \ldots n\}$, $\mathcal{L} : \{1 \ldots m\}$ $\mathcal{LA} = \{(i,k) | \text{location } i \in \mathcal{L} \text{ is connected with location } k \in \mathcal{L}\}$, $\mathcal{PA} = \{(j, \ell) | \text{part } j \in \mathcal{P} \text{ is a substitute for part } \ell \in \mathcal{P}\}$ $\mathcal{C} = \{(i,j,k,\ell) | \forall (i,k) \in \mathcal{LA} \text{ and } \forall (j,\ell) \in \mathcal{PA} \text{ and } (i,j) <> (k,\ell)\}$ where $\mathcal{P}$ is a set of parts, $\mathcal{L}$ is a set of locations, $\mathcal{LA}$ is a set of connected locations, $\mathcal{PA}$ is a set of substitution pairs, and $\mathcal{C}$ is a set of connected pairs.

The model 313 is further based on the following input parameters:

$pr_i$: price of part $i$ $\forall i \in \mathcal{P}$ $o_{ij}$: on hand in location $i$ for part $j$ $\forall i \in \mathcal{L}$ and $\forall j \in \mathcal{P}$ $bo_{ij}$:

$\begin{cases} 0 & \text{if there is an on-hand in location } i \text{ for part } j \\ 1 & \text{else} \end{cases}$ $\forall i \in \mathcal{L}$ and $\forall j \in \mathcal{P}$ $r_{k\ell}$: distance between location $k$ and $\ell$ $\forall k \in \mathcal{L}$ and $\forall \ell \in \mathcal{L}$ $f_{ij}$: demand forecast in location $i$ for part $j$ $\forall i \in \mathcal{L}$ and $\forall j \in \mathcal{P}$ $c$: Average expedited transportation cost per unit distance The model 313 is further based on the following binary values:

$Y_{ij} = \begin{cases} 1 & \text{if part } j \text{ is stocked at location } i \\ 0 & \text{if part } j \text{ is not stocked at location } i \end{cases}$ $\forall j \in \mathcal{P}$ and $\forall i \in \mathcal{L}$ $X_{ijk\ell} = \begin{cases} 1 & \text{if stock level of part } j \text{ at location } i \text{ supports demand of part } k \text{ in location } \ell \\ 0 & \text{if stock level of part } j \text{ at location } i \text{ does not support demand of part } k \text{ in location } \ell \end{cases}$ $\forall (i, j, k, \ell) \in C$ The model 313 is further based on tuning parameters α and β, where α is a local service level coefficient, and β is a pooling level coefficient. The local service level coefficient α may specify a percentage of a plurality of warehouses (e.g. all, or at least some, of the warehouses in a distribution network) that are required to meet their respective local demand for any of a plurality of parts (or other articles). The pooling level coefficient β may specify a percentage of the plurality of warehouses that are required to meet their respective local demand, as well as demand that originates from one or more unplanned locations In one implementation, the model 313 is defined by objective function OF1:

$ES = \sum_{i \in \mathcal{L}} \sum_{j \in \mathcal{P}} \max(0, S_{ij} - o_{ij}) * pr_i + \sum_{i \in \mathcal{L}} \sum_{j \in \mathcal{P}} Y_{ij} + \sum_{(i,j,k,\ell) \in \mathcal{C}} X_{ijk\ell} * r_{ik} * f_{k\ell} * c$  (OF1)

The value ES, which objective function OF1 evaluates to, is an efficiency score. The first part of the objective function OF1, $\sum_{i \in \mathcal{L}} \sum_{j \in \mathcal{P}}$ max (0, $S_{ij}$–$o_{ij}$)*$pr_i$, estimates the stock amount for each pair (i,j). The main caveat in this part is that it only penalizes the objective function OF 1 if the user plans for pair (i,j) more than what is already stocked at location i. This approach prevents moving the stock from one inventory to another and also exploits the inventory already available at different locations, as the objective is in favor of stocking in locations which already have an inventory on on hand. The second part, $\sum_{i \in \mathcal{L}} \sum_{j \in \mathcal{P}} Y_{ij}$ is not incremented if part j is not being stocked at location i. The second part contributes to the total value of the objective function OF1 only when part i is stocked at location j. The second part is essentially a count of part pools that are defined by the set of values Y (and/or the pooling plan 322). The third part, $\sum_{(i,j,k,\ell) \in C} X_{ijk\ell} * r_{ik} * f_{k\ell} * c$ calculates the expected transportation cost (e.g., expedited transportation cost) for any part j between location i and location k.

Objective function OF1 is subject to constraints C1-5 below:

$$S_{ij} = \left\lceil Y_{ij} * f_{ij} + \sum_{(i,j,k,\ell) \in C} X_{ijk\ell} * f_{k\ell} \right\rceil \forall i \in \mathcal{L}, \forall j \in \mathcal{P} \quad (C1)$$

$$\frac{\sum_{i \in \mathcal{L}} \sum_{j \in \mathcal{P}} Prob(S_{ij} \geq d_{ij})}{n*m} \geq \alpha \quad (C2)$$

$$\frac{\sum_{i \in \mathcal{L}} \sum_{j \in \mathcal{P}} Prob\left(S_{ij} \geq Y_{ij} * d_{ij} + \sum_{(k,\ell,i,j) \in C} X_{ijk\ell} * d_{k\ell}\right)}{n*m} \geq \beta \quad (C3)$$

$$X_{ijk\ell} \leq Y_{ij} \ (i, j, k, \ell) \in C \quad (C4)$$

$$\sum_{(i,j,k,\ell) \in C} X_{ijk\ell} \leq 1 \forall k \in \mathcal{L} \text{ and } \forall \ell \in \mathcal{P} \quad (C5)$$

Constraint C1 calculates the stock level $S_{ij}$ for pair (i, j)—i.e., the stock level for part j at location i. Constraint C2 enforces the average probability of meeting demand locally. Constraint C3 enforces the average probability of meeting demand locally or by pooling. Constraint C4 ensures that each pair (k, l) is only supported by a pair (i,j)—i.e., it ensures that part j, which is being used as a substitute for part 1, is stocked at location j when part 1 is not being stocked at location 1. Constraint C5 ensures that each pair can be only supported at most from one pooling pair.

In some implementations, it is possible to transform the objective function OF 1 into a pure integer program by making a few simplifying assumptions and approximations. This transformation makes it possible to solve the pooling problem using integer programming techniques, which are more computationally efficient.

First, it is possible to approximate the local service level, $$\frac{\sum_{i \in \mathcal{L}} \sum_{j \in \mathcal{P}} Prob(S_{ij} \geq d_{ij})}{n*m},$$

in constraint C2, as a proportion of forecast planned locally divided by total forecast across all pairs:

$$\frac{\sum_{i \in \mathcal{L}} \sum_{j \in \mathcal{P}} Prob(S_{ij} \geq d_{ij})}{n*m} \propto \frac{\sum_{i \in \mathcal{L}} \sum_{j \in \mathcal{P}} Y_{ij} f_{ij} + \sum_{(k,\ell,i,j) \in C} X_{ijit} f_{i\ell}}{\sum_{i \in \mathcal{L}} \sum_{j \in \mathcal{P}} f_{ij}}$$

Similarly, it is possible to approximate the local plus pooling service level, $$\frac{\sum_{i \in \mathcal{L}} \sum_{j \in \mathcal{P}} Prob\left(S_{ij} \geq Y_{ij} * d_{ij} + \sum_{(k,\ell,i,j) \in C} X_{ijk\ell} * d_{k\ell}\right)}{n*m},$$

in constraint C3, as a proportion of forecast planned locally or by pooling divided by total forecast across all pairs:

$$\frac{\sum_{i \in \mathcal{L}} \sum_{j \in \mathcal{P}} Prob\left(S_{ij} \geq Y_{ij} * d_{ij} + \sum_{(k,\ell,i,j) \in C} X_{ijk\ell} * d_{k\ell}\right)}{n*m} \propto$$

$$\frac{\sum_{i \in \mathcal{L}} \sum_{j \in \mathcal{P}} Y_{ij} f_{ij} + \sum_{(k,\ell,i,j) \in C} X_{ijk\ell} * f_{k\ell}}{\sum_{i \in \mathcal{L}} \sum_{j \in \mathcal{P}} f_{ij}}$$

Moreover, instead of specifying the stock level $S_{ij}$ for pair (i, j) in constraint C1, $S_{ij} = \lceil Y_{ij} * f_{ij} + \sum_{(i,j,k,\ell) \in C} X_{ijk\ell} * f_{k\ell} \rceil$, it is possible to focus on assignment of Y and X. Assuming the demand for each pair follows a Poisson distribution with mean $Y_{ij} * f_{ij} + \sum_{(i,j,k,\ell) \in C} X_{ijk\ell} * f_{k\ell}$, it is possible can specify the stock value after solving the optimization problem. With this approach, constraint C1 and its ceiling function can be eliminated from the optimization problem that is solved by the model 313.

Lastly, in the objective function OF1, it is possible to replace $\sum_{i \in \mathcal{L}} \sum_{j \in \mathcal{P}}$ max(0, $S_{ij}$–$o_{ij}$)*$pr_i$, with $\sum_{i \in \mathcal{L}} \sum_{j \in \mathcal{P}} Y_{ij} pr_i o_{ij}$, such that only one unit of part i is stocked for each pair (i, j) when $Y_{ij}$=1 and this piece increases the objective if there is no on hand already for that pair, which is encoded in definition of $o_{ij}$.

In view of the above, it is possible to re-write objective function OF1 as objective function OF2, which is subject to constraints C6-C7. In other words, in another implementation, the model 313 may be defined as objective function OF2.

$$ES = \sum_{i \in \mathcal{L}} \sum_{j \in \mathcal{P}} Y_{ij} pr_i oh_{ij} + \sum_{i \in \mathcal{L}} \sum_{j \in \mathcal{P}} Y_{ij} +$$
$$\sum_{(i,j,k,\ell) \in C} X_{ijk\ell} * r_{ik} * X_{ijk\ell} * c \quad (OF2)$$

$$\frac{\sum_{i \in \mathcal{L}} \sum_{j \in \mathcal{P}} Y_{ij} f_{ij} + \sum_{(i,j,k,\ell) \in C} X_{ijit} f_{i\ell}}{\sum_{i \in \mathcal{L}} \sum_{j \in \mathcal{P}} f_{ij}} \geq \alpha' \quad (C6)$$

$$\frac{\sum_{i \in \mathcal{L}} \sum_{j \in \mathcal{P}} Y_{ij} f_{ij} + \sum_{(i,j,k,\ell) \in C} X_{ijk\ell} * X_{ijk\ell}}{\sum_{i \in \mathcal{L}} \sum_{j \in \mathcal{P}} f_{ij}} \geq \beta' \quad (C7)$$

$$X_{ijk\ell} \leq Y_{ij} (i,j,k,\ell) \in C \quad (C8)$$

$$\sum_{(i,j,k,\ell) \in C} X_{ijk\ell} \leq 1 \forall k \in \mathcal{L} \text{ and } \forall \ell \in \mathcal{P} \quad (C9)$$

The value ES, which objective function OF2 evaluates to, is an efficiency score. Although objective function OF2 only approximates objective function OF1 (rather than being equivalent), objective function OF2 serves the purpose of identifying the optimal pooling locations for different parts, since %95+ of cases we actually stock only one piece for a pair to be planned.

As noted above, constraints C6-C9 can be derived from constraints C2-C5, respectively. Constraint C6 is based on a local service level coefficient α', rather than the local service level coefficient α. The local service level coefficient α' is different from the local service level coefficient α, but it is nonetheless proportional to the local service level coefficient α. Constraint C7 is based on a pooling level coefficient β', rather than the pooling level coefficient β. The pooling level coefficient β' is different from the pooling level coefficient β, but it is nonetheless proportional to the pooling level coefficient β.

Figure 5:
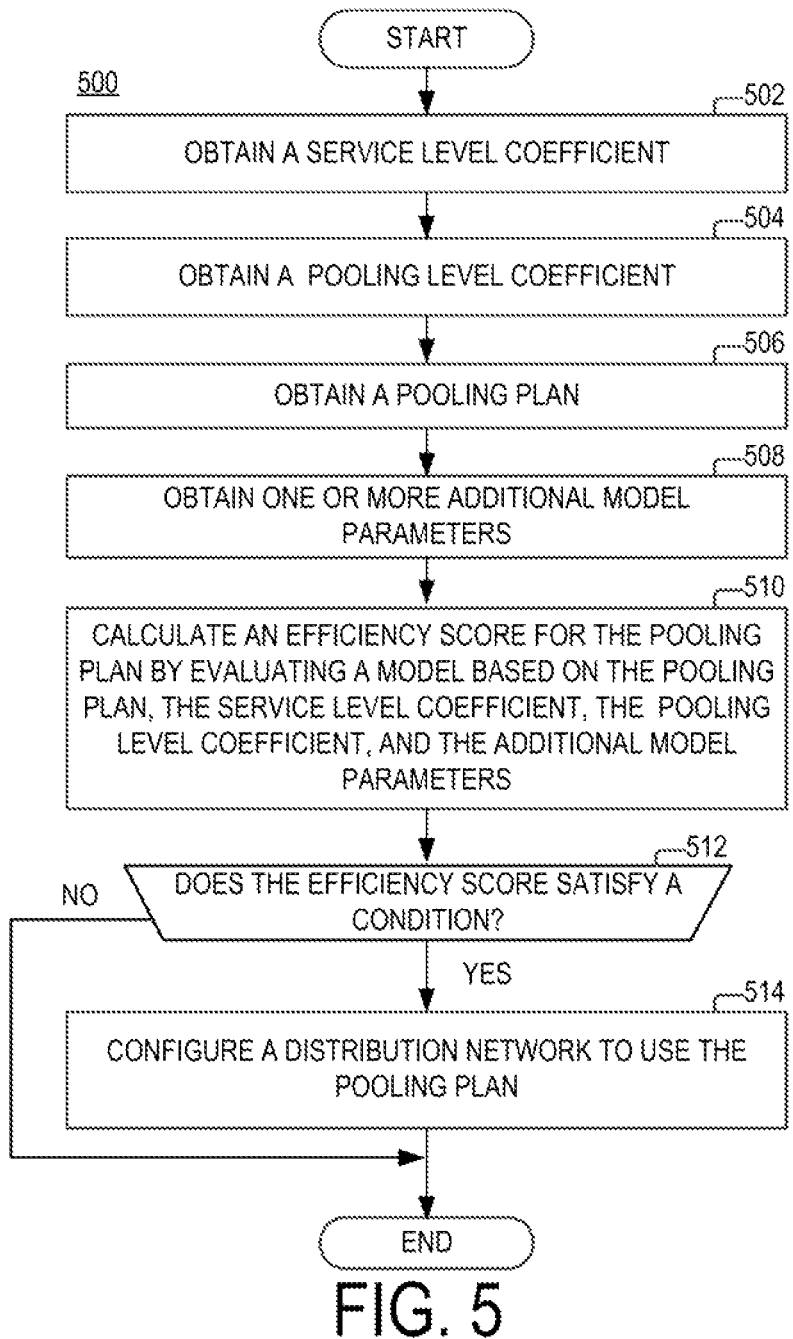
FIG. 5 is a flowchart of an example of a process, according to aspects of the disclosure.

FIG. 5 is a flowchart of an example of a process 500, according to aspects of the disclosure. Although in the example of FIG. 5 the process 500 is performed by the engine 312, it will be understood that the present disclosure is not limited to any specific manner of executing the process 500.

At step 502, the engine 312 obtains a service level coefficient. The service level coefficient may be the same or similar to one of the coefficients α or α', which are discussed above with respect to objective functions OF1 and OF2. In some implementations, at step 502, the engine 312 may receive user input specifying the value of the service level coefficient. Additionally or alternatively, in some implementations the engine 312, may retrieve the value of the service level coefficient from the memory 320.

At step 504, the engine 312 obtains a pooling level coefficient. The pooling level coefficient may be the same or similar to one of the coefficients β or β' which are discussed above with respect to objective functions OF1 and OF2. In some implementations, at step 502, the engine 312 may receive user input specifying the value of the pooling level coefficient. Additionally or alternatively, in some implementations, the engine 312 may retrieve the value of the pooling level coefficient from the memory 320.

At step 506, the engine 312 obtains a pooling plan for one or more parts. According to the present example, obtaining the pooling plan includes obtaining the set of values Y, which is discussed above with respect to objective functions OF1 and OF2. Additionally or alternatively, in some implementations, obtaining the pooling plan may include obtaining the set of stock level values S, which is calculated in accordance with constraint C1. Additionally or alternatively, in some implementations, the pooling plan may be the same or similar to the pooling plan 322, which is discussed above with respect to FIG. 3, but the present disclosure is not limited to any specific format of the pooling plan 322. In some implementations, at step 506, the engine 312 may receive user input specifying the pooling plan. Additionally or alternatively, in some implementations, the engine 312 may retrieve the pooling plan from the memory 320.

At step 508, the engine 312 obtains one or more additional parameters for evaluating the model 313. In some implementations, the one or more parameters may include any of the remaining sets and/or input parameters that are part of one of objective functions OF1 and OF2. In some implementations, the obtained parameters may be the same or similar to any of the model parameters 329, which are discussed above with respect to FIG. 3. In some implementations, the one or more additional parameters may include a first data set that identifies one or more second parts that can be substituted with a first part. In some implementations, the first data set may include the plurality of values $X_{ijk\ell}$. In some implementations, the one or more additional parameters may include a second data set that identifies: (i) local demand for the first part at a pooling location, (ii) local demand for the first part at one or more unplanned locations for the first part, and (iii) local demand for the second part at one or more unplanned warehouses for the second part. In some implementations, the second data set may include the plurality of values $f_{ij}$, where each respective value $f_{ij}$ identifies local demand for part j at location i. It will be understood that the present disclosure is not limited to receiving any specific additional parameters at step 508. In some implementations, at step 508, the engine 312 may receive user input specifying the additional parameters. Additionally or alternatively, in some implementations, the engine 312 may retrieve the additional parameters from the memory 320.

At step 510, the engine 312 calculates an efficiency score ES for the pooling plan (obtained at step 506) by evaluating the model 313. Evaluating the model 313 may include evaluating one of objective functions OF1 and OF2 based on: (i) the pooling plan, (ii) the value of the service level coefficient, (iii) the value of the pooling level coefficient, (iv) and the one or more additional parameters.

At step 512, the engine 312 determines whether the efficiency score satisfies a predetermined condition. In some implementations, the condition may be satisfied when and only when the efficiency score has a first value—in other words, if the efficiency score has a second value, the condition would not be satisfied. Additionally or alternatively, the condition may be satisfied when and only when the efficiency score is below a threshold value—in other words, if the efficiency score is above the threshold value, the condition would not be satisfied. Additionally or alternatively, the condition may be satisfied when and only when the efficiency score falls within a first range of values—in other words, if the efficiency score falls within a second range, the condition would not be satisfied. If the condition is satisfied, the process 500 proceeds to step 514. Otherwise, if the condition is not satisfied, the process 500 ends.

At step 514, a distribution network is configured to use the pooling plan (obtained at step 506). In some implementations, the distribution network may be the same or similar to the distribution network 100, which is discussed above with respect to FIGS. 1 and 2. In some implementations, configuring the distribution network may include any action that would cause the distribution network to pool parts at pooling locations for those parts that are specified by the pooling plan. In some implementations, configuring the distribution network may include storing the pooling plan in the inventory database 324. Additionally or alternatively, configuring the distribution network may include configuring the inventory database 324 to identify stock amounts for different part-location pairs that are determined based on the pooling plan. In some implementations, the inventory database 324 may be configured automatically by the engine 312. Additionally or alternatively, in some implementations, the engine 312 may display the efficiency score on the display device 340, after which the inventory database 324 may be updated manually by a user. Although in the example of FIG. 5, the efficiency score is used to re-configure a distribution network, after the efficiency score is output on the display device 340, it will be understood that the present disclosure is not limited to any specific use of the efficiency score after the efficiency score is output on the display device 340.

In some implementations, the process 500 may be executed multiple times for different model plans to identify a plan that has an acceptable efficiency score. Repeating the process 500 may have the effect of minimizing one of the objective functions OF1 or OF2. In other words, executing the process 500 repetitively can help identify a pooling plan that results in the objective function having a (local or global) minimum value.

Additionally or alternatively, in some implementations, the process 500 may be repeated multiple times for the same pooling plan, but with different service level coefficient and/or pooling coefficient values. Executing the process 500 in this manner may help determine the local service level and the pooling service level that can be provided by a certain pooling plan at an acceptable cost (i.e., a cost corresponding to an acceptable efficiency score).

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. As noted above, in some implementations, the contract analyzer 114 may be configured to analyze a different type of contract (i.e. a contract that is not an NDA). In some such implementations, the contract analyzer 114 may utilize a user contract template, whose user provision vectors represent provisions in the user's form for the other type of contract.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid-state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. /Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method for use in a computing device, comprising:
obtaining, by at least one processor, a pooling plan, the pooling plan identifying a respective pooling warehouse for at least a first article, wherein obtaining the pooling plan includes retrieving, from a memory, at least a portion of one or more first data structures that constitute the pooling plan;

receiving, by the at least one processor, a first data set that identifies one or more second articles that can be substituted with the first article, the first data set being retrieved from a substitution map, the substitution map including one or more second data structures that are configured to identify parts which are interchangeable;

receiving, by the at least one processor, a second data set that identifies: (i) local demand for the first article at the pooling warehouse, (ii) local demand for the first article at one or more unplanned warehouses for the first article, and (iii) local demand for the second articles at one or more unplanned warehouses for the second articles;

calculating, by the at least one processor, an efficiency score for the pooling plan by evaluating a model for gauging an efficiency of the pooling plan, the model being evaluated based on the pooling plan, the first data set, the second data set, and a pooling level constraint $\beta$ that indicates a percentage of a plurality of warehouses that are required to meet both local demand and pooling demand for any of a plurality of articles, the plurality of articles including the first article and the one or more second articles; and detecting whether the efficiency score satisfies a predetermined condition; and configuring a distribution network to use the pooling plan, the distribution network being configured when and only when the efficiency score satisfies the predetermined condition, wherein configuring the distribution network to use the pooling plan includes storing the pooling plan in an inventory database and causing the inventory database to identify stock amount for different part-location pairs that are determined based on the pooling plan.

2. The method of claim 1, wherein the one or more unplanned warehouses for the first article include at least one warehouse that relies, at least in part, on deliveries of the first article from the respective pooling warehouse in order to meet local demand for the first article.

3. The method of claim 1, wherein the one or more unplanned warehouses for the second articles include at least one warehouse that relies, at least in part, on deliveries of the first article from the respective pooling warehouse in order to meet local demand for any of the second articles.

4. The method of claim 1, wherein the second data set includes a plurality of values $f_{ij}$, where $i \in \mathcal{L}$, $j \in \mathcal{P}$, $\mathcal{L}$ is a set of warehouses, $\mathcal{P}$ is a set of articles, and each value $f_{ij}$ identifies local demand for article j at warehouse i.

5. The method of claim 1, wherein the pooling plan includes a plurality of values $Y_{ij}$, where $i \in \mathcal{L}$, $j \in \mathcal{P}$, $\mathcal{L}$ is a set of warehouses, $\mathcal{P}$ is a set of articles, and each value $Y_{i,j}$ indicates whether article j is being stocked at warehouse i.

6. The method of claim 1, wherein the first data set includes a plurality of values $X_{ijkl}$, where $i \in \mathcal{L}$, $j \in \mathcal{P}$, $k \in \mathcal{L}$, $l \in \mathcal{P}$, $\mathcal{L}$ is a set of warehouses, $\mathcal{P}$ is a set of articles, and each value $X_{ijkl}$ indicates whether article j when stored in warehouse i can be used to fulfill local demand for article k at location l.

7. The method of claim 1, wherein the model is evaluated further based on a local service level constraint $\alpha$ that indicates a percentage of a plurality of warehouses that are required to meet local demand for any of a plurality of articles, the plurality of articles including the first article and the one or more second articles.

8. A system, comprising:
a memory; and
one or more processors operatively coupled to the memory, the one or more processors further being configured to perform the operations of:

obtaining a pooling plan, the pooling plan identifying a respective pooling warehouse for at least a first article, wherein obtaining the pooling plan includes retrieving, from the memory, at least a portion of one or more first data structures that constitute the pooling plan;

receiving a first data set that identifies one or more second articles that can be substituted with the first article, the first data set being retrieved from a substitution map, the substitution map including one or more second data structures that are configured to identify parts which are interchangeable;

receiving a second data set that identifies: (i) local demand for the first article at the pooling warehouse, (ii) local demand for the first article at one or more unplanned warehouses for the first article, and (iii) local demand for the second articles at one or more unplanned warehouses for the second articles;

calculating an efficiency score for the pooling plan by evaluating a model for gauging an efficiency of the pooling plan, the model being evaluated based on the pooling plan, the first data set, the second data set, and a pooling level constraint $\beta$ that indicates a percentage of a plurality of warehouses that are required to meet both local demand and pooling demand for any of a plurality of articles, the plurality of articles including the first article and the one or more second articles;

detecting whether the efficiency score satisfies a predetermined condition; and configuring a distribution network to use the pooling plan, the distribution network being configured when and only when the efficiency score satisfies the predetermined condition, wherein configuring the distribution network to use the pooling plan includes storing the pooling plan in an inventory database and causing the inventory database to identify stock amount for different part-location pairs that are determined based on the pooling plan.

9. The system of claim 8, wherein the one or more unplanned warehouses for the first article include at least one warehouse that relies, at least in part, on deliveries of the first article from the respective pooling warehouse in order to meet local demand for the first article.

10. The system of claim 8, wherein the one or more unplanned warehouses for the second articles include at least one warehouse that relies, at least in part, on deliveries of the first article from the respective pooling warehouse in order to meet local demand for any of the second articles.

11. The system of claim 8, wherein the second data set includes a plurality of values $f_{ij}$, where $i \in \mathcal{L}$, $j \in \mathcal{P}$, $\mathcal{L}$ is a set of warehouses, $\mathcal{P}$ is a set of articles, and each value $f_{ij}$ identifies local demand for article j at warehouse i.

12. The system of claim 8, wherein the pooling plan includes a plurality of values $Y_{ij}$, where $i \in \mathcal{L}$, $j \in \mathcal{P}$, $\mathcal{L}$ is a set of warehouses, $\mathcal{P}$ is a set of articles, and each value $Y_{i,j}$ indicates whether article j is being stocked at warehouse i.

13. The system of claim 8, wherein the first data set includes a plurality of values $X_{ijkl}$, where $i \in \mathcal{L}$, $j \in \mathcal{P}$, $k \in \mathcal{L}$, $l \in \mathcal{P}$, $\mathcal{L}$ is a set of warehouses, $\mathcal{P}$ is a set of articles, and each value $X_{ijkl}$ indicates whether article j when stored in warehouse i can be used to fulfill local demand for article k at location l.

14. The system of claim 8, wherein the model is evaluated further based on a local service level constraint $\alpha$ that indicates a percentage of a plurality of warehouses that are required to meet local demand for any of a plurality of articles, the plurality of articles including the first article and the one or more second articles.

15. A non-transitory computer-readable medium storing one or more processor-executable instructions, which, when executed by at least one processor, cause the at least one processor to perform the operations of:

obtaining a pooling plan, the pooling plan identifying a respective pooling warehouse for at least a first article, wherein obtaining the pooling plan includes retrieving, from a memory, at least a portion of one or more first data structures that constitute the pooling plan;

receiving a first data set that identifies one or more second articles that can be substituted with the first article, the first data set being retrieved from a substitution map, the substitution map including one or more second data structures that are configured to identify parts which are interchangeable;

receiving a second data set that identifies: (i) local demand for the first article at the pooling warehouse, (ii) local demand for the first article at one or more unplanned warehouses for the first article, and (iii) local demand for the second articles at one or more unplanned warehouses for the second articles;

calculating an efficiency score for the pooling plan by evaluating a model for gauging an efficiency of the pooling plan, the model being evaluated based on the pooling plan, the first data set, and the second data set, and a pooling level constraint $\beta$ that indicates a percentage of a plurality of warehouses that are required to meet both local demand and pooling demand for any of a plurality of articles, the plurality of articles including the first article and the one or more second articles;

detecting whether the efficiency score satisfies a predetermined condition; and configuring a distribution network to use the pooling plan, the distribution network being configured when and only when the efficiency score satisfies the predetermined condition, wherein configuring the distribution network to use the pooling plan includes storing the pooling plan in an inventory database and causing the inventory database to identify stock amount for different part-location pairs that are determined based on the pooling plan.

* * * * *